Feb. 8, 1949.   A. MARSHALL   2,460,942
COLLAPSIBLE HEADREST
Filed Feb. 21, 1947   2 Sheets-Sheet 1
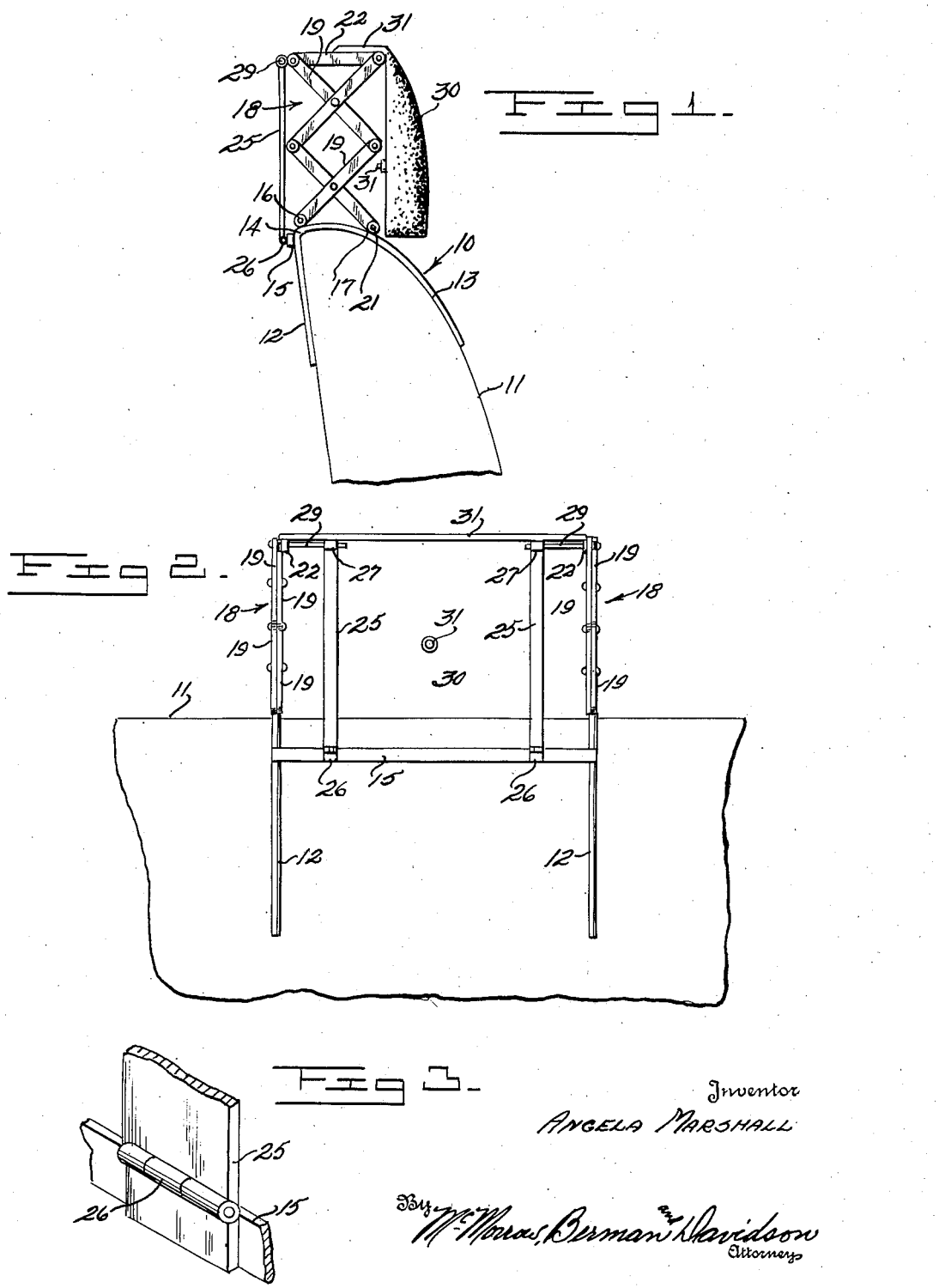

Feb. 8, 1949.   A. MARSHALL   2,460,942
COLLAPSIBLE HEADREST
Filed Feb. 21, 1947   2 Sheets-Sheet 2
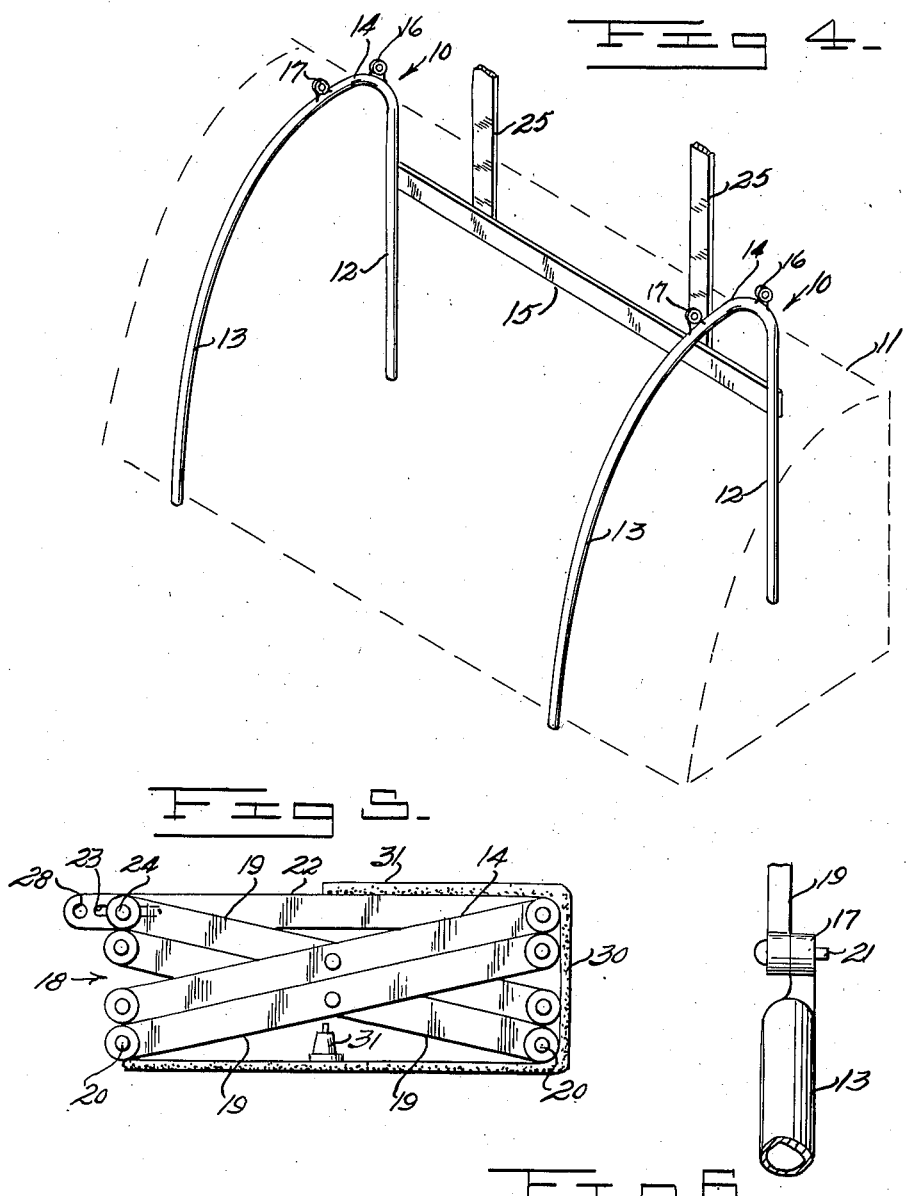
Inventor
ANGELA MARSHALL Patented Feb. 8, 1949

2,460,942

UNITED STATES PATENT OFFICE 2,460,942

COLLAPSIBLE HEADREST

Angela Marshall, Adel, Iowa

Application February 21, 1947, Serial No. 730,020

2 Claims. (Cl. 155—174)

My invention relates to head rests and more particularly to collapsible head rests.

The object of my invention is to provide a collapsible head rest adapted to be removably attached to the back of a seat in a passenger car, to give comfort to a person on a long trip, or to ailing persons riding in a plain passenger car, if an ambulance is not available, or for truck drivers on off-shift during long drives.

Other objects of my invention may appear in the following specification describing it with reference to the accompanying drawings illustrating a preferred embodiment of my invention.

It is, however, to be understood, that my invention is not to be restricted and limited to the exact construction and combination of parts described in the specification and shown in the drawings, but that such changes and modifications may be made, which fall within the scope of the claims appended hereto.

In the drawings:

Figure 1 is an elevational side view of a head rest according to my invention attached to a fragmentarily shown back of a seat of a passenger car.

Figure 2 is an elevational rear view of the head rest shown in Figure 1.

Figure 3 is a perspective detail view of one of the bracing bars hingedly secured to a transverse member of the supporting frame of the head rest according to my invention.

Figure 4 is a perspective view of the supporting frame, the bracing bars being shown fragmentarily in upright or operative position.

Figure 5 is an elevational side view of the collapsible frame and the head rest, the frame being shown in collapsed position and the head rest being shown deflated, and Figure 6 is a fragmentary perspective view of one of the brackets adapted to engage the back of the seat in a passenger car and one of the members of a collapsible frame pivotally and removably connected thereto.

Referring now in detail to the drawings the collapsible head rest forming the subject matter of my invention has a supporting frame comprising two brackets 10 made preferably from tubular metallic material and bent in a substantially inverted U-shape to fit onto the top of a back 11 of a seat in a passenger car.

Each of these brackets 10 has a straight rear flange 12 adapted to lie flat against the back surface of the seat back 11 and a curved front flange 13 adapted to fit onto the front surface of said back.

The two flanges are connected with each other by a curved upper portion 14 fitting onto the top of the seat back.

The two brackets 10 are connected with each other and kept at a predetermined distance from each other by means of a horizontally arranged transverse bar 15, firmly secured in any conventional way to the upper portions of the straight rear flanges 12 of the brackets 10.

On the curved upper portion 14 of each bracket 10 a perforated upwardly extending lug 16 is provided and on the upper portion of each front flange 13 an upwardly extending perforated lug 17 is arranged.

Two collapsible frames 18 are provided and each of these frames consists of a plurality of bars 19 connected with each other in the shape of lazy tongs.

The two lower bars 19 of each collapsible frame 18 are provided with a hole 20 adjacent the lower ends of the respective bars.

When the collapsible frames 18 are extended into operative position the holes 19 can be arranged coaxially with the perforations in the lugs 16 and 17 on the brackets 10. Bolts 21 are inserted through the coaxial holes and perforations and secure the collapsible frames 18 removably on the brackets 10.

Onto the front end of each of the two forwardly extending upper bars 19 a horizontal top bar 22 is pivotally attached and is provided with longitudinal slot 23 located inwardly of the rear end of said bar.

The rear end of the adjacent rearwardly extending top bar 19 is pivotally connected with the horizontal top bar 22 by means of a bolt 24 or the like extending slidably through the slot 23.

Two bracing bars 25 are hingedly secured to the horizontal transverse bar 15 of the supporting frames 10 as shown at 26 and each bracing bar 25 is provided on its upper end with transverse eye 27.

The horizontal upper bar 22 of each collapsible frame 18 has adjacent its rear end a hole 28 and a bolt 29 extending removably through each hole 28 and the adjacent eye 27 connecting the bracing bars 25 with the collapsible frames 18 and preventing accidental collapsing of said frames.

An inflatable cushion 30 made from rubber or any other suitable material has at its upper edge a suspender flap 31 secured to the upper edges of the horizontal top bars 22 of the two collapsible frames 18. The inflatable cushion 30 is provided on its rear side with an air valve 31, through which air may be forced into the cushion or may be permitted to escape therefrom.

When the above described head rest is in operative position on the back of a seat in a passenger car or the like the cushion hangs downwardly and is adapted to support the head of a passenger comfortably thereon.

When not in use the above described head rest can be quickly and easily dismounted and folded for storage in a comparatively small space.

Having described my invention I claim as new and desire to secure by Letters Patent:

1. A headrest for the back of a seat having a cushion and including a pair of brackets spaced apart and adapted to be simultaneously mounted on the seat back, a pair of upwardly-extending apertured lugs secured upon each bracket, a pair of collapsible frames having the cushion secured to the upper portions thereof and each frame consisting of a plurality of bars connected together in lazy tongs fashion, the lowermost bars of each collapsible frame having holes in the lower ends thereof, bolts serving to extend through the apertured lugs on the brackets and the holes in the bars to secure the collapsible frames to the brackets, a rearwardly-extending horizontal top bar pivotally connected at the forward end thereof to the front end of the forwardly-extending upper bar on each collapsible frame, the upper end of the corresponding rearwardly-extending upper bar in each collapsible frame being connected pivotally and slidably to the rearward portions of the respectively adjacent horizontal top bar, a transverse horizontal bar secured to both brackets and holding them apart, and a pair of upwardly-projecting bracing bars mounted at the lower ends thereof upon the transversely-horizontal bar independently of said brackets and having transversely-open eyes upon the upper ends thereof, the rear ends of the rearwardly-extending horizontal top bars having holes therein, and bolts extending through the latter holes in the rear ends of the horizontal top bars and the eyes on the upper ends of said upwardly-projecting bracing bars.

2. A headrest for the back of a seat, having a cushion and including a pair of brackets spaced apart and adapted to be simultaneously mounted on the seat back, each bracket including a downwardly-extending forward bracket portion and a downwardly-extending rearward bracket portion with a curved top portion interconnecting both bracket portions, a pair of upwardly-extending apertured lugs secured in spaced-apart relation upon the curved upper top portion of each bracket, a pair of collapsible frames having the cushion secured to the upper portions thereof and each frame consisting of a plurality of bars connected together in lazy tongs fashion, the lowermost bars of each collapsible frame having holes in the lower ends thereof, bolts serving to extend through the apertured lugs on the brackets and the holes in the bars to secure the collapsible frames to said brackets, a rearwardly-extending horizontal top bar pivotally connected at the forward end thereof to the front end of the forwardly-extending upper bar in each collapsible frame, the upper end of the corresponding rearwardly-extending upper bar in each collapsible frame being connected pivotally and slidably to the rear portions of the respectively adjacent horizontal top bar, a transverse horizontal bar secured at the ends thereof to the upper portions of the downwardly-extending rearward bracket portions on both brackets and holding the latter apart, and a pair of upwardly-projecting bracing bars hinged at the lower ends thereof to the transverse horizontal bar at predetermined distances within said brackets in spaced-apart relation and having transversely-open eyes fixed upon the upper ends thereof, the rear ends of the rearwardly-extending horizontal top bars having holes therein, and bolts extending through the latter holes in the rear ends of said horizontal top bars and the eyes on the upper ends of said upwardly-projecting bracing bars.

ANGELA MARSHALL.

REFERENCES CITED

The following references are of record in the file of this patent:

UNITED STATES PATENTS

| Number | Name | Date |
|---|---|---|
| 18,998 | Waters | Dec. 29, 1857 |
| 27,806 | Howell | Apr. 10, 1860 |
| 1,512,260 | Wilson | Oct. 21, 1924 |
| 2,001,396 | Pumphrey | May 14, 1935 |
| 2,434,007 | O'Dea | Jan. 6, 1948 |

FOREIGN PATENTS

| Number | Country | Date |
|---|---|---|
| 55,716 | Australia | Oct. 10, 1912 |